(12) United States Patent
Wilson et al.

(10) Patent No.: US 8,156,019 B2
(45) Date of Patent: Apr. 10, 2012

(54) ACCOUNTS PAYABLE TAX RULES PROCESSING SYSTEM AND METHOD

(75) Inventors: Christopher Wilson, Dallas, TX (US); Michael Williamson, Frisco, TX (US)

(73) Assignee: Nascent Systems, L.P., Plano, TX (US)

( * ) Notice: Subject to any disclaimer, the term of this patent is extended or adjusted under 35 U.S.C. 154(b) by 793 days.

(21) Appl. No.: 11/977,220

(22) Filed: Oct. 24, 2007

(65) Prior Publication Data
US 2009/0187500 A1  Jul. 23, 2009

(51) Int. Cl.
*G06F 17/22* (2006.01)
(52) U.S. Cl. ........................................................ 705/31
(58) Field of Classification Search ........................ None
See application file for complete search history.

(56) References Cited

U.S. PATENT DOCUMENTS

| | | | | |
|---|---|---|---|---|
| 7,043,448 B2 * | 5/2006 | Campbell | ...................... | 705/31 |
| 2002/0184125 A1 | 12/2002 | Cirulli et al. | | |
| 2003/0055754 A1 * | 3/2003 | Sullivan | ......................... | 705/31 |
| 2005/0010511 A1 | 1/2005 | Conroy et al. | | |
| 2006/0200407 A1 | 9/2006 | Hartley et al. | | |
| 2007/0156475 A1 * | 7/2007 | Berger et al. | ..................... | 705/7 |
| 2007/0192218 A1 * | 8/2007 | Licardi et al. | ................... | 705/30 |
| 2007/0203815 A1 | 8/2007 | Maegerlein | | |

OTHER PUBLICATIONS

PCT Search Report and Written Opinion from corresponding PCT/US2008/081105 mailed May 29, 2009, 10 pgs.
International Preliminary Report on Patentability and Written Opinion, mailed May 6, 2020 (5 pgs.).

* cited by examiner

*Primary Examiner* — Faris Almatrahi
(74) *Attorney, Agent, or Firm* — Jackson Walker L.L.P.; Christopher J. Rourk

(57) ABSTRACT

A system for generation of accounts payable processing system tax rules is provided. A tax account system generates an account for a tax jurisdiction. An over-tax rule system generates one or more rules for processing a tax amount in excess of a required tax amount associated with the tax jurisdiction. An under-tax rule system generates one or more rules for processing a tax amount that is less than the required tax amount associated with the tax jurisdiction.

21 Claims, 6 Drawing Sheets

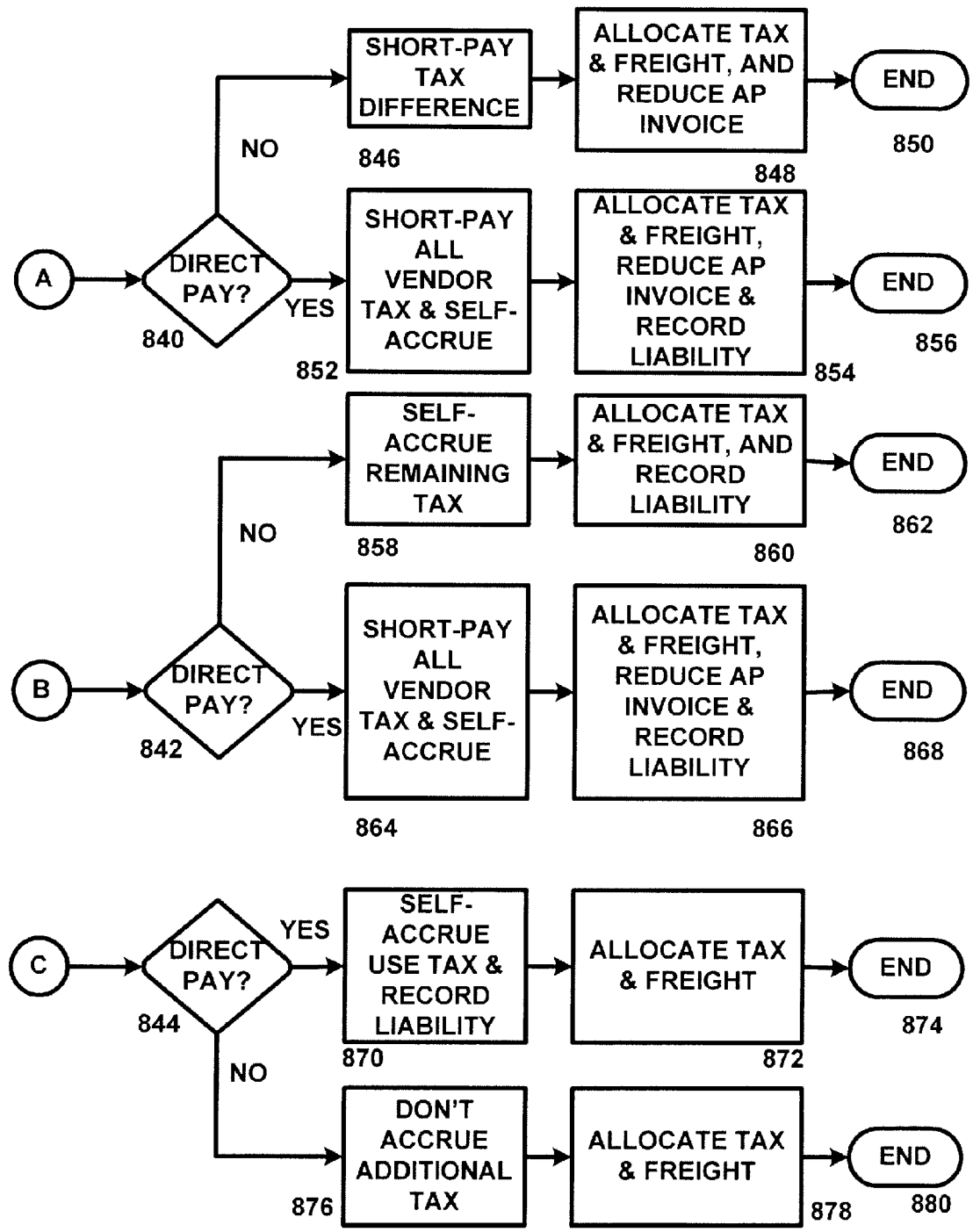

ACCOUNTS PAYABLE TAX RULES PROCESSING SYSTEM AND METHOD

FIELD OF THE INVENTION

The invention relates to data processing, and in particular to an accounts payable tax rules processing system and method that allows an accounts payable processing system to be configured to verify that the tax rules for multiple jurisdictions have been properly applied.

BACKGROUND OF THE INVENTION

Systems for processing accounts payable records are known in the art. Such systems allow a clerk to enter an invoice or other record that is received from a supplier of goods and services so that authorization of payment of the invoice can be performed. For example, the accounts payable system can verify that the invoice matches the goods ordered on a purchase order, can allocate expenses to appropriate accounts, post the accounting entries to a General Ledger, and optionally require approval for payment.

Although such accounts payable systems have improved the processing of invoices and reduced the risk of fraud or improper payments, one area of weakness for such accounts payable systems relates to the validation of transaction based taxes, including sales tax, consumers use tax and international VAT. For example, within the United States, if a seller or provider of goods or services is registered to collect tax in the jurisdiction in which the transaction occurs, then the seller must charge the buyer the applicable taxes and remit such taxes to the taxing jurisdiction. However, if the buyer provides the seller with a valid exemption certificate, then the seller has no obligation to charge the buyer any applicable taxes. Examples of exemption certificates include manufacturing exemptions and resale exemptions where the transaction is exempt from tax, as well as direct pay certificates whereby the buyer is responsible for remitting the tax directly to a taxing jurisdiction. If the seller is not registered to collect tax in the particular jurisdiction in which the transaction occurs, then the consumer, or buyer of the goods and services, may need to self-accrue tax and remit such taxes directly to the taxing jurisdiction instead of the supplier. Furthermore, individual product and service taxability varies widely across taxing jurisdictions, thus a product or service may be taxable in one state, but exempt in another, or taxed at a basis of less than 100 percent. For countries outside of the United States, the variability with respect to whether the vendor should charge VAT or the buyer of goods should self-assess VAT depend on whether the buyer and/or seller are registered for VAT within the country, whether the transaction involves triangulation across multiple countries, whether a commissionaire structure is involved, or whether the purchase relates to services, just to name a few conditions. Thus, given all the variability in who is responsible for remitting the tax, what is taxable vs. non-taxable, and the fact that tax rates and legislation changes on a monthly basis, it is very difficult for non-tax personnel such as accounts payable clerks to correctly validate vendor charged tax, and/or decide to manually accrue tax which should be paid directly to the taxing jurisdiction. The clerks performing data entry into the accounts payable system lack the knowledge and training to determine how tax should be applied. As such, it is often necessary for businesses to perform periodic audits of tax payments that have been made by hiring trained tax auditors to review annual tax payments to identify overpayments and underpayments. With respect to tax overpayments, tax auditors will typically agree to perform these audits for a percentage of the tax savings resulting from the refund of overpaid taxes.

SUMMARY OF THE INVENTION

In accordance with the present invention, a system and method are provided for processing accounts payable transactions to verify that taxes have been properly assessed by the seller or provider of goods or services, and/or to self-accrue taxes if necessary.

In particular, a system and method are provided for processing accounts payable invoices that allows a user to configure rules for allocating taxes and other charges such as freight, withholding payment of taxes, adjusting supplier invoices for over-assessed taxes, and accruing for under-assessed taxes for direct payment to tax jurisdictions which reduces the risk of underpayment or overpayment of taxes.

In accordance with an exemplary embodiment of the present invention, a system for generation of accounts payable processing system tax rules is provided. A tax system generates the appropriate tax expense and liability, if accrued, for a tax jurisdiction. An over-tax rule system generates one or more rules for processing a tax amount in excess of a required tax amount associated with the tax jurisdiction. An under-tax rule system generates one or more rules for processing a tax amount that is less than the required tax amount associated with the tax jurisdiction.

The present invention provides many important technical advantages. One important technical advantage of the present invention is a system and method for flexibly configuring processes for determining the proper taxes to be assessed for an invoice as part of the accounts payable data entry process that allows jurisdiction-specific tax rules to be implemented so as to avoid overpayment of taxes and to ensure payment of the proper amount of taxes, so as to avoid liability to either the seller or provider of goods of services or the purchaser of the goods or services.

Those skilled in the art will further appreciate the advantages and superior features of the invention together with other important aspects thereof on reading the detailed description that follows in conjunction with the drawings.

BRIEF DESCRIPTION OF THE SEVERAL VIEWS OF THE DRAWINGS

FIGS. 8A and 8B are diagrams of a method 800 in accordance with an exemplary embodiment of the present invention.

DETAILED DESCRIPTION OF PREFERRED EMBODIMENTS

Figure 1:
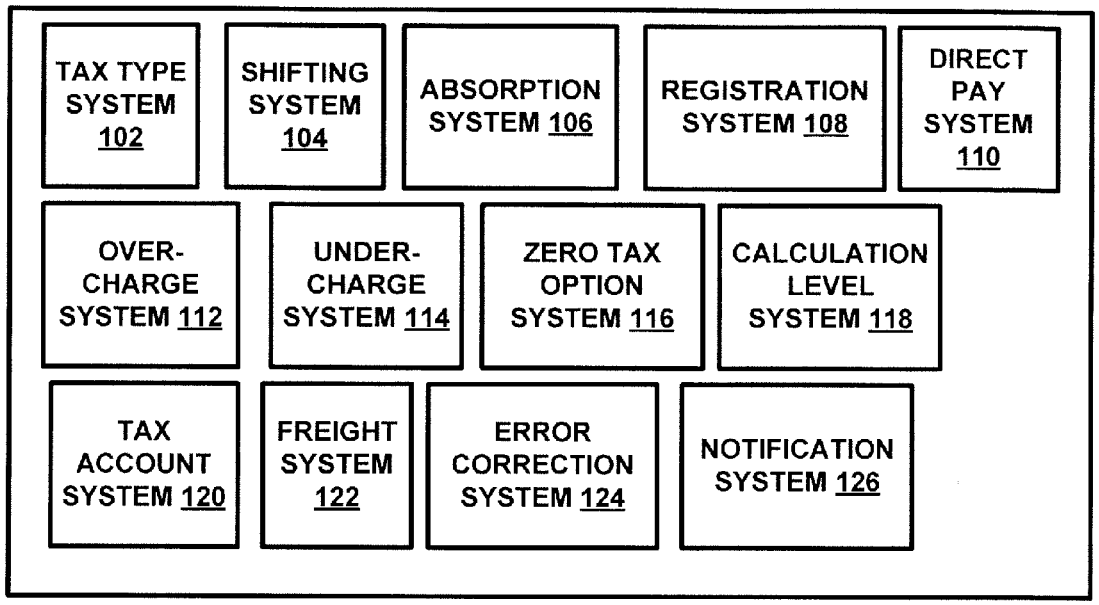
FIG. 1 is a diagram of a system for creating rules for tax allocation in accordance with an exemplary embodiment of the present invention.

In the description that follows, like parts are marked throughout the specification and drawings with the same reference numerals, respectively. The drawing figures might not be to scale, and certain components can be shown in generalized or schematic form and identified by commercial designations in the interest of clarity and conciseness.

FIG. 1 is a diagram of a system 100 for creating rules for tax allocation in accordance with an exemplary embodiment of the present invention. System 100 allows rules for allocation of taxes for accounts payable invoices to be configured in accordance with the tax laws of separate jurisdictions, so as to reduce the likelihood of tax overpayment and to eliminate the need for tax audits to identify overpayments.

System 100 includes tax type system 102, shifting system 104, absorption system 106, registration system 108, direct pay system 110, overcharge system 112, undercharge system 114, zero tax option system 116, calculation level system 118, tax account system 120, freight system 122, error correction system 124 and notification system 126, each of which can be implemented in hardware, software, or a suitable combination of hardware and software, and which can be one or more software systems operating on a general purpose processing platform. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

Tax type system 102 allows a user to identify a tax jurisdiction type so as to generate rules for the proper processing of accounts payable items for that jurisdiction. In one exemplary embodiment, tax type system 102 allows the user to identify the type of tax jurisdiction, such as by selecting from a list of jurisdictions, a type of tax jurisdiction, or other suitable jurisdictions, and generates rules associated with that tax jurisdiction. Likewise, tax type system 102 allows tax type to be determined based on one or more jurisdictions, such as state, county, city, or other jurisdictions. The tax jurisdiction rules for an accounts payable processing system can be predetermined, user-modifiable, or otherwise configurable.

Shifting system 104 allows a user to create rules for mandatory shifting of the tax burden to purchaser. In one exemplary embodiment, certain tax jurisdictions may have a mandatory shifting requirement that requires the purchaser to pay taxes for any items purchased in the state. Likewise, other jurisdictions may not require mandatory shifting, such that the purchaser or the seller may be assessed with the tax burden. Shifting system 104 allows a user to configure shifting rules for an accounts payable processing system based on a jurisdiction, seller, or in other suitable manners.

Absorption system 106 allows rules to be created for absorption of taxes, such as where the seller or party responsible for collecting taxes can pay the tax without having to be reimbursed or passing the tax on to the purchaser or a consumer. In one exemplary embodiment, absorption requirements can vary based on the jurisdiction and can be different for different jurisdictions that a seller or purchaser is subject to, such as state, county or city jurisdictions. Absorption system 106 thus allows absorption rules to be configured for an accounts payable processing system based on the specific tax laws of the specific jurisdictions in which a seller or purchaser is operating.

Registration system 108 allows rules for an accounts payable processing system to be configured based on registration requirements associated with a specific jurisdiction. In one exemplary embodiment, a jurisdiction may require a purchaser to register so as to allow that tax jurisdiction to audit the purchaser's activities, to allow the purchaser to make direct payments on taxes to that jurisdiction, or to otherwise allow the purchaser to interact with the tax authorities. Registration system 108 allows rules to be configured for an accounts payable processing system for proper allocation and payment of taxes based on the registration requirements for a jurisdiction, such as to require funding of a tax liability account for taxes for that jurisdiction.

Direct pay system 110 allows rules for an accounts payable processing system to be configured for direct payment of taxes to a jurisdiction tax authority. In one exemplary embodiment, the purchaser can pay tax to the tax jurisdiction of the seller, and in another exemplary embodiment, only the seller can pay the taxes. Where the seller is required to pay taxes, if the seller underpays or under-assesses the taxes, then the seller is ultimately responsible to the tax jurisdiction for the payment. Likewise, if the seller overpays the taxes, the purchaser will have to request a refund from the seller and coordinate such refund with the jurisdiction. Direct pay system 110 allows accounts payable processing system rules to be generated for processing accounts payables for a seller to allow the seller to handle such payments (such as where the seller is sophisticated and can be relied on for proper payment of taxes), to allow the purchaser to make payments for all taxes, taxes that the seller has underpaid, or for other suitable conditions.

Overcharge system 112 allows accounts payable processing system rules to be created for handling of tax overcharges. In one exemplary embodiment, when a tax amount is overcharged, the purchaser can elect to not pay the overcharge and to withhold the overcharged amount from the invoice. In another exemplary embodiment, the overcharge can be paid but can also be tracked for later offset. Likewise, rules can be created setting levels for overcharges that will be paid and levels at which overcharges will be withheld, such as based on the total amount of the overcharge, the percentage of the overcharge relative to the invoice, or for other suitable conditions.

Undercharge system 114 allows accounts payable processing rules to be created for processing of undercharged taxes. In one exemplary embodiment, when the burden for undercharged taxes falls on the purchaser, the purchaser can elect to accrue the difference between the actual tax and the undercharged tax so as to make tax payments to the tax authority. Likewise, the purchaser can also elect to accrue the taxes even where the purchaser is not responsible for payment of taxes, such as to allow the purchaser to assist a seller that has undercharged the taxes.

Zero tax option system 116 allows the user create rules for an accounts payable processing system to set zero tax at a jurisdiction level such as the state, county, or city so as to allow the user to self accrue taxes for direct payment of taxes to the jurisdiction.

Calculation level system 118 allows the user to create rules for an accounts payable processing system to define a calculation level for accounts payable invoices, such as a transaction level calculation, a line level calculation transaction, or other suitable calculations. In one exemplary embodiment, the accounts payable invoices can include a plurality of classes for items where certain items can be classified as requiring line level determination of tax payments. Likewise, certain purchasers can be classified so as to allow transaction level allocation of taxes, such as where certain purchases are made only from purchasers for items that are not subject to sales tax, where taxes are capped for a jurisdiction based on a maximum tax so as to avoid payment of taxes when the transaction exceeds the maximum amount, or for other suitable purposes.

Tax account system 120 allows rules to be generated for an accounts payable processing system to allow a tax account to be identified for accrual of sales tax amounts that result from undercharged sales tax, self-accrual selections, or other suitable functions. Tax account system 120 allows tax accounts to be identified for state, county, or other jurisdiction levels, where suitable. In one exemplary embodiment, a state may have responsibility for allocation of taxes to counties, cities or other jurisdictions, such that a single tax account for that jurisdiction encompasses all other taxing jurisdictions within that jurisdiction. In another exemplary embodiment, separate tax accounts may be required for one or more of the additional jurisdictions within a state or other overriding jurisdiction. Tax account system 120 allows a user to configure tax accounts for such jurisdictions, can automatically identify such jurisdictions, or can perform other suitable functions.

Freight system 122 generates one or more rules for processing freight and other charges following the taxability of the underlying base charges. For example, within some states within the U.S., the taxability for freight depends on the taxability of the underlying charge for which the freight applies. In such states, if the underlying charge to which the freight applies is taxable, then the freight is taxable, whereas if the underlying charge to which the freight applies is non-taxable, then the freight is non-taxable. To accommodate freight taxability following the underlying charges to which it applies, freight system 122 provides option and jurisdiction override settings that generate rules for determining whether to combine the charges (base and freight/other charges) together in order to effectively calculate the proper tax. If there is no dependency between freight/other charges and the base charges, the freight system 122 separate line items to a tax engine to calculate tax separately for the base charge from the freight/other charges.

Freight system 122 also provides the ability to control freight and miscellaneous charge allocations. Configuration rules can be generated that allow users to specify whether freight and other miscellaneous charges should be allocated back to their respective base charges, or simply booked to a separate account (e.g. a common freight account, a finance charge account, or other suitable accounts). In another exemplary embodiment, rules can be generated to specify whether freight and miscellaneous charges should be allocated back to a project, task and expenditure type based on such attributes assigned to the base charge account, or other suitable categories.

Error system 124 facilitates reconciliation of errors introduced by third party tax engines, such as where a transaction is generated in the third-party tax engine but not in the accounts payable processing system. To reconcile the third-party tax engine and the accounts payable system, error system 124 identifies and removes such extraneous transactions, such as by reversing or deleting the phantom transactions in the third-party tax application, depending on whether such transactions have already been filed and reported to the proper taxing jurisdiction. Error system 124 accommodates manual and imported transaction sources, and includes transaction activity that creates errors in the accounts payable system, is deleted from the accounts payable system or that is reversed and re-entered in the accounts system due to constraints on accounts payable invoices that are already paid, have already been posted to a General Ledger system, or other suitable errors.

Notification system 126 allows the user to configure accounts payable processing system rules that create notification requests for short-payment of over-charged tax amounts, self-accrual of tax amounts, payment of over-charged tax amounts, or for other suitable conditions. In one exemplary embodiment, notification system 126 can be used to create rules that generate a notification requesting authorization for withholding of an overcharged tax amount if the amount exceeds a predetermined dollar value, a predetermined percentage of the overall cost of the goods and services, or in other suitable manners. Notification system 126 can create rules that require a response to the notification to be received before action is taken and to implement additional rules based on the response, such as by authorizing the short-pay of the overcharged if the response is an approval, authorizing payment of the overcharge if the response is a denial, or other suitable rules. Notifications can include approval notifications, FYI notifications, supplier notifications and error notifications based on user defined actions and tolerances specified within related configuration forms. The workflow notifications can be dependent upon the type of action (tax overcharge, tax undercharge, no tax, direct pay, or tax only invoice) that is identified once the tax results are returned from the third-party tax engine and compared to the tax, or lack thereof, on the accounts payable invoice.

In operation, system 100 allows the user to generate a set of tax rules for each jurisdiction that the user receives accounts payable invoices for. In one exemplary embodiment, the user can include a company having operations in multiple jurisdictions and making purchases from suppliers in multiple jurisdictions, such that the tax liability for the company based on where the purchase is made, where the purchased items are being used, and how the purchased items are being used cannot be readily determined. In this exemplary embodiment, an accounts payable clerk that is entering accounts payable items from an invoice will be faced with the task of determining whether or not the taxes have been properly computed as reported by the seller. Because such accounts payable clerks do not generally have the expertise or the time to make such determinations properly and because tax laws are continually changing, system 100 allows rules for an accounts payable processing system to be established for processing accounts payable invoices after entry by an account payable clerk, so as to allow the correct amount of taxes to be determined and to avoid overpayment of taxes.

In particular, system 100 can be used to provide system-level and jurisdiction override rules for overcharged tax, undercharged tax and no tax. In one exemplary embodiment, a configuration form can be used to generate system-level tax rules for tax overcharges, undercharges and no tax. The rules can default for all jurisdictions unless overridden at a jurisdiction level.

For more detailed control, a rule can be generated that provides a jurisdiction and product-specific overrides form that allows the system to utilize different action rules for tax overcharges, undercharges and no tax, so as to configure the accounts payable system to comply with tax laws. For example, if a company is registered in a state such as Alabama, which is considered a Seller's Privilege state, and a supplier undercharges the buyer or consumer of goods and services, then rules can be generated to pay the supplier charged amount for tax, and not self-accrue the remainder since the buyer has no liability in this jurisdiction. For a different state such as Mississippi, considered a Consumer's Levy state, whereby the buyer of good and services is ultimately responsible for paying the proper tax, rules can be generated to pay the supplier charged tax and self-accrue the remainder which would be remitted directly to the taxing jurisdiction by the buyer. The system provides similar functions for tax overcharges, and no tax. In the case of no tax, or zero tax, rules can be generated to handle direct pay situations whereby a buyer provides a direct-pay certificate to a supplier so that the supplier does not charge sales tax, but the system needs to self-accrue use tax. Other jurisdiction override options include what account to book tax liability to, whether charges such as freight should follow the underlying taxability of the base charge, whether tax calculation should be performed on an individual line or the entire invoice, thereby supporting maximum tax jurisdictions that apply at an entire invoice level, or other suitable overrides. Override options can be specified at a country level, state/province level, county/parish level, or other suitable levels.

System 100 also provides real-time calculation during entry of invoices. For example, the system can be integrated with a standard accounts payable invoice validation system, which verifies whether an accounts payable invoice is entered in an open period, contains equal amounts of debits and credits, or other which performs other suitable functions. During the validation process, the system makes a call to a third-party tax engine and waits to compare the estimated tax results from the third-party tax engine to the vendor charged tax on the invoice, if any. In order to minimize future support issues, the system can utilize a personalization feature of the third party tax engine to update the invoice amount in order to stay in synchronization with updates to the distributions section of the accounts payable invoice form in the case of tax adjustments related to vendor overcharges or undercharges of tax.

System 100 can also be used to handle input and input/output tax processing for a single accounts payable invoice, such as to reverse charge. Action sets can be defined in a common functional currency, regardless of a transaction currency. Enterprise resource system transactions can also be processed, accounting for tax expense, tax liability and charge allocations such as freight can also be performed. Configuration can be performed using a client extension of an accounts payable processing system, and determination of recoverable or non-recoverable value-added tax amounts as determined by a third party tax engine or accounts payable system can also be performed.

Figure 2:
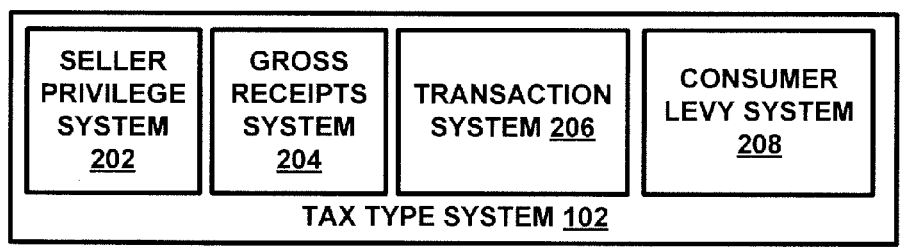
FIG. 2 is a diagram of a system for creating accounts payable processing system rules based on a tax jurisdiction type in accordance with an exemplary embodiment of the present invention.

FIG. 2 is a diagram of a system 200 for creating accounts payable processing system rules based on a tax jurisdiction type in accordance with an exemplary embodiment of the present invention. System 200 includes tax type system 102 and seller privilege system 202, gross receipts system 204, transaction system 206 and consumer levy system 208, each of which can be implemented in hardware, software, or a suitable combination of hardware and software, and which can be one or more software systems operating on a general purpose processing platform.

Seller privilege system 202 allows a user to generate accounts payable processing system rules for a tax jurisdiction implementing a seller privilege tax model. In one exemplary embodiment, the seller privilege tax is imposed on the seller for the privilege of doing business in the state. The seller may or may not be able to shift the tax to the consumer depending on state law. As such, the seller may be able to elect whether to pass the tax on to the end consumer or not, such that the amount of the sales tax can be used as a separately stated amount of tax on the invoice. In another exemplary embodiment, a seller privilege jurisdiction may require that the tax be shifted to the consumer and separately stated on the invoice such that the tax is closer to a retail tax that the seller is required to collect even though it is characterized as a seller privilege tax. Seller privilege system 202 allows accounts payable processing system rules to be configured for individual sellers, jurisdictions, or in other suitable manners.

Gross receipts system 204 allows a user to generate accounts payable processing system rules for a gross receipts tax jurisdiction. A gross receipts tax jurisdiction can require a tax to be paid by the provider of goods or services rather than the purchaser of services, and can include a tax on the total revenue, regardless of the source, that is levied on the seller of goods or services rather than on the consumer. A gross receipts tax jurisdiction can thus be different from a tax system in which separate taxes are listed as line items on billings and are not directly included in the listed price on the item. Gross receipts system 204 allows accounts payable processing system rules to be configured for individual sellers, jurisdictions, or in other suitable manners.

Transaction system 206 allows a user to generate accounts payable processing system rules for a transaction tax jurisdiction. In one exemplary embodiment, a transaction tax jurisdiction can require mandatory shifting of the tax burden from the collector to the party who suffers the tax cost. In this exemplary embodiment, the tax is usually imposed on an accounts payable invoice and the purchaser is ultimately responsible for the amount of taxes. In one exemplary embodiment, a purchaser that pays invoiced taxes to the seller in a transaction tax jurisdiction may nonetheless still be liable for payment of the taxes to the taxing jurisdiction in the event that the seller or provider of goods or services fails to do so, such as if the seller or provider goes out of business before paying the taxes or otherwise fails to pay the taxes. As such, rules created by selection of a transaction tax jurisdiction control of transaction system 206 can be used to create rules that cause invoiced taxes entered into an accounts payable processing system to be withheld from payment to the seller and for such taxes to be accrued into a tax account for direct payment to a tax authority.

Consumer levy system 208 allows a user to generate rules for an accounts payable processing system for a consumer levy tax jurisdiction, such as one where the seller is required to collect the tax from the purchaser upon whom it is imposed. In a consumer levy jurisdiction, the seller may not be allowed to absorb the tax unless it is separately stated on the sales invoice. As such, rules can be created using consumer levy system 208 to cause invoiced taxes to be corrected if incorrect, and for the corrected amount of taxes to be paid to the seller, such as by interfacing with a tax rules database to confirm that the invoiced amount of taxes is correct.

In operation, system 200 allows different tax structures to be implemented as sets of rules that are used to process accounts payables using an accounts payable processing system. System 200 allows a tax type for a jurisdiction to be created quickly based on the jurisdiction's general tax type, and further allows the user to modify the specific rules to accommodate any idiosyncrasies for that tax jurisdiction.

Figure 3:
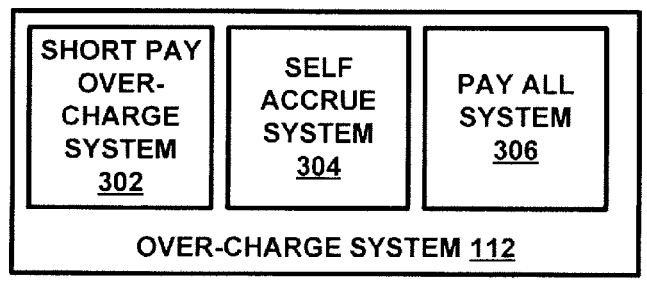
FIG. 3 is a diagram of a system for creation of accounts payable processing system rules for managing overcharges in accordance with an exemplary embodiment of the present invention.

FIG. 3 is a diagram of a system 300 for creation of accounts payable processing system rules for managing overcharges in accordance with an exemplary embodiment of the present invention. System 300 includes overcharge system 112 and short pay overcharge system 302, self-accrue system 304 and pay-all system 306, each of which can be implemented in hardware, software, or a suitable combination of hardware and software, and which can be one or more software systems operating on a general purpose processing platform.

Short-pay overcharge system 302 allows a user to create rules for an accounts payable processing system to notify one or more predetermined users that an amount of tax assessed for an item, invoice, or other charge has been overcharged and to provide the users with the option of short-paying the amount of overcharge. In one exemplary embodiment, the user may enter a number of line items and a single tax amount, and short-pay overcharge system 302 can determine whether the total taxes due for each line item are less than the amount of tax invoiced, such as by determining whether taxes are assessed for a given line item in that taxing jurisdiction based on the type of item (freight, items for resale, etc.), whether the jurisdiction applies a maximum tax rule, or for other suitable processes. If the amount of tax for each line item is configured to be separately identified, short-pay overcharge system 302 can be used to generate rules for an accounts payable processing system to automatically recalculate the taxes, to request approval for underpayment of the overcharged invoice amount, to pay the overcharged amount and track the total overpayments made for subsequent reimbursement or offset, or other suitable rules.

Self-accrue system 304 allows a user to create accounts payable processing system rules to self-accrue taxes for payment to a tax authority or seller. In one exemplary embodiment, self-accrue system 304 allows the user to create an account and to associate that account with jurisdictions, so as to fund that account with tax amounts that should be paid directly to a taxing jurisdiction or to other suitable parties.

Pay-all system 306 allows a user to create accounts payable processing system rules to pay all taxes regardless of whether or not they have been correctly calculated. In one exemplary embodiment, pay-all system 306 can be used where the seller or provider of services pays special taxes (such as telecommunications services providers), where the seller is sophisticated and is likely to have properly assessed the required taxes, or for other suitable purposes.

In operation, system 300 allows accounts payable processing system rules to be created to allow overcharges that are invoiced to a purchaser to be processed in accordance with the specific policies of an organization. In one exemplary embodiment, system 300 operates in combination with the systems of system 100 so as to allow a user to create rules for payment of overcharged taxes, self-accrual of overcharges, to require approval for withholding of overcharged taxes, or to perform other suitable functions.

Figure 4:
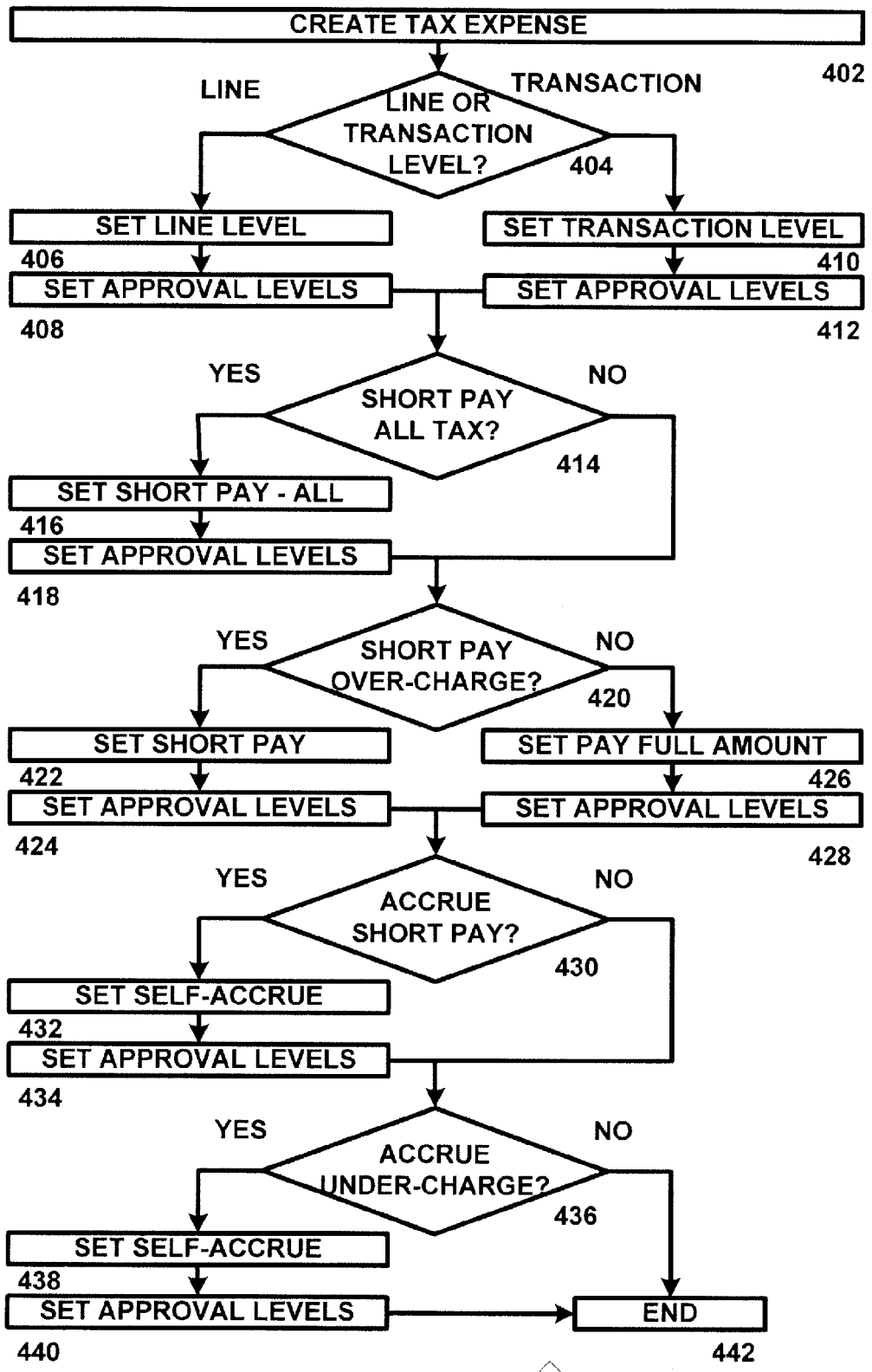
FIG. 4 is a flowchart of a method for creating rules for an accounts payable processing system in accordance with an exemplary embodiment of the present invention.

FIG. 4 is a flowchart of a method 400 for creating rules for an accounts payable processing system in accordance with an exemplary embodiment of the present invention. Method 400 allows an accounts payable processing system to be configured to verify tax payments and to pay overcharged taxes, withhold payment of overcharged taxes, request approvals, or perform other suitable functions so as to avoid overpayment of taxes. The order of steps shown is exemplary, and individual rule generation processes can be omitted or performed in other suitable orders.

Method 400 begins at 402 where a tax expense is created. In one exemplary embodiment, the tax expense can be associated with a jurisdiction, so that the relevant tax jurisdiction can be determined based on where the goods or services are sold from or provided to. For example, a seller may be subject to city, county, state, and federal taxes depending on where the goods or services are provided from, such that the tax expense for one or more for each of those jurisdiction can be created. Likewise, a purchaser may be subject to city, county, state, and federal taxes based on where the purchaser receives the goods or services, such that the tax expense for one or more for each of those jurisdiction can be created. The method then proceeds to 404.

At 404, it is determined whether the rules for the tax jurisdiction should use line or transaction level processing. In one exemplary embodiment, line level processing may be selected where the jurisdiction assesses taxes based on line-level detail, such as whether the item being taxed is going to be resold, whether the item being taxed is a freight charge, or based on other suitable details. In another exemplary embodiment, a jurisdiction may assess a maximum tax per invoice. Likewise, rules can be generated based on product-specific overrides, jurisdiction overrides, or other suitable overrides, regardless of the associated tax jurisdiction. If it is determined at 404 that line level processing is required for the jurisdiction associated with the tax account, the method proceeds to 406 where line level detail is set. The method then proceeds to 408 where approval levels are selected. In one exemplary embodiment, approval levels for variations in line level settings can be set so as to require the user to seek approval for variations in excess of a dollar amount, a percentage of total sales, or other suitable approval levels. The method then proceeds to 414.

If it is determined that transaction level processing is required at 404 the method proceeds to 410 where a transaction level of processing is set for invoices associated with a tax jurisdiction. The method then proceeds to 412 where approval levels are set, such as to require a data entry clerk to obtain approval for payment of taxes that exceed maximum taxes for that jurisdiction. The method then proceeds to 414.

At 414, is determined whether to create a rule for all taxes to be short-paid. In one exemplary embodiment, short-payment of all taxes can result from a jurisdiction rule, such as a zero tax option, from a type of tax jurisdiction such as a transactional tax jurisdiction, or based on other suitable circumstances. Likewise, rules can be generated based on product-specific overrides, jurisdiction overrides, or other suitable overrides, regardless of the associated tax jurisdiction. If it is determined that all taxes will be short-paid, the method proceeds to 416 where a rule for short payment of all taxes is created. The method then proceeds to 418.

At 418, rules for approval levels are set, such as to create a rule that requires notification or approval from one or more predetermined users for short-payment of taxes when the total amount of taxes is greater than a predetermined value, when the total amount of taxes exceeds a percentage of the goods purchased, or in other suitable circumstances. The method then proceeds to 420. Likewise, if it is determined at 414 that short payment of taxes will not be performed the method proceeds directly to 420.

At 420, rules for short-payment of an overcharged tax amount are created. In one exemplary embodiment, rules can be created when it is determined on a line level or transaction level that an overcharge of taxes has been assessed by the seller. If rules for short payment of such overcharges for a jurisdiction tax account are created, the method proceeds to 422 where a short payment rule is created to deduct the amount of overcharged taxes from a payment on an invoice in an accounts payable system. Likewise, rules can be generated based on product-specific overrides, jurisdiction overrides, or other suitable overrides, regardless of the associated tax jurisdiction. The method then proceeds to 424 where approval levels are set. In one exemplary embodiment, approval level rules can be set so as to automatically short pay all overcharged amounts, to require approval of a short payment based on the total amount of tax to be short paid, the amount as a percentage of total invoice for goods or services, or in other suitable manners. The method then proceeds to 430.

If it is determined at 420 that rules for short payment of overcharged taxes will not be created, the method proceeds to 426 where a rule is created to pay the full amount of the invoiced tax. The method then proceeds to 428 where approval levels can be set, such as to require approval of the full amount of tax where an overpayment would be performed or in other suitable manners. The method then proceeds to 430.

At 430, it is determined whether to create rules to accrue short-pay amounts. For example, if the amounts charged for tax on an invoice are in excess of the actual taxes, the short-pay amounts can be accrued, such as where self-payment of taxes is available in a jurisdiction. Likewise, rules can be generated based on product-specific overrides, jurisdiction overrides, or other suitable overrides, regardless of the associated tax jurisdiction. If it is determined that rules for accruement of short-paid taxes should be created, the method proceeds to 432 where a self-accrued rule or rules for an accounts payable processing system are created. The method then proceeds to 434 where approval levels are set, such as to allow the user to determine levels at which approval is required for accruement of short payment of taxes. The method then proceeds to 436. Likewise, if it is determined at 430 that accruing short-pay amounts is not to be performed, the method proceeds to 436.

At 436, it is determined whether to create rules to accrue undercharged taxes. In one exemplary embodiment, the amount of tax assessed by a seller may be less than the actual amount of taxes due. In this exemplary embodiment, the seller may incur the tax liability for failure to assess the correct tax, in which case accruing undercharged taxes may be declined and the method will proceed from 436 to 442 and terminate. Likewise, if it is determined that the buyer is at risk for underpayment of taxes or where it is determined that the impact on the seller would otherwise be undesirable, the method proceeds to 438 where rules are generated for self-accrual of undercharged taxes by the accounts payable processing system. Likewise, rules can be generated based on product-specific overrides, jurisdiction overrides, or other suitable overrides, regardless of the associated tax jurisdiction. The method then proceeds to 440 where rules for approval levels are set, such as to obtain approval where the amount of self-accrual exceeds a predetermined dollar value, percentage of the underlying goods or services sold, or other suitable parameters. The method then proceeds to 442 and terminates.

In operation, method 400 allows a user to configure accounts payable processing system rules for processing of accounts payable invoices at a line item level, transaction level, or other suitable levels. Method 400 allows the user to configure accounts payable rules to short-pay all taxes, short-pay overcharges, to accrue the short-pay amounts, accrue undercharges, or to perform other suitable actions so as to allow the user to control the amount of taxes that are overpaid to a seller or tax jurisdiction. In this manner, the taxes assessed by a seller can be verified and overpayment of taxes can be avoided so as to eliminate the need to periodically audit total tax amounts and sales and to request refund of overpaid amounts. Likewise, method 400 prevents underpayments of taxes and potential consequences that can result from the failure to pay the proper amount of taxes.

Figure 5:
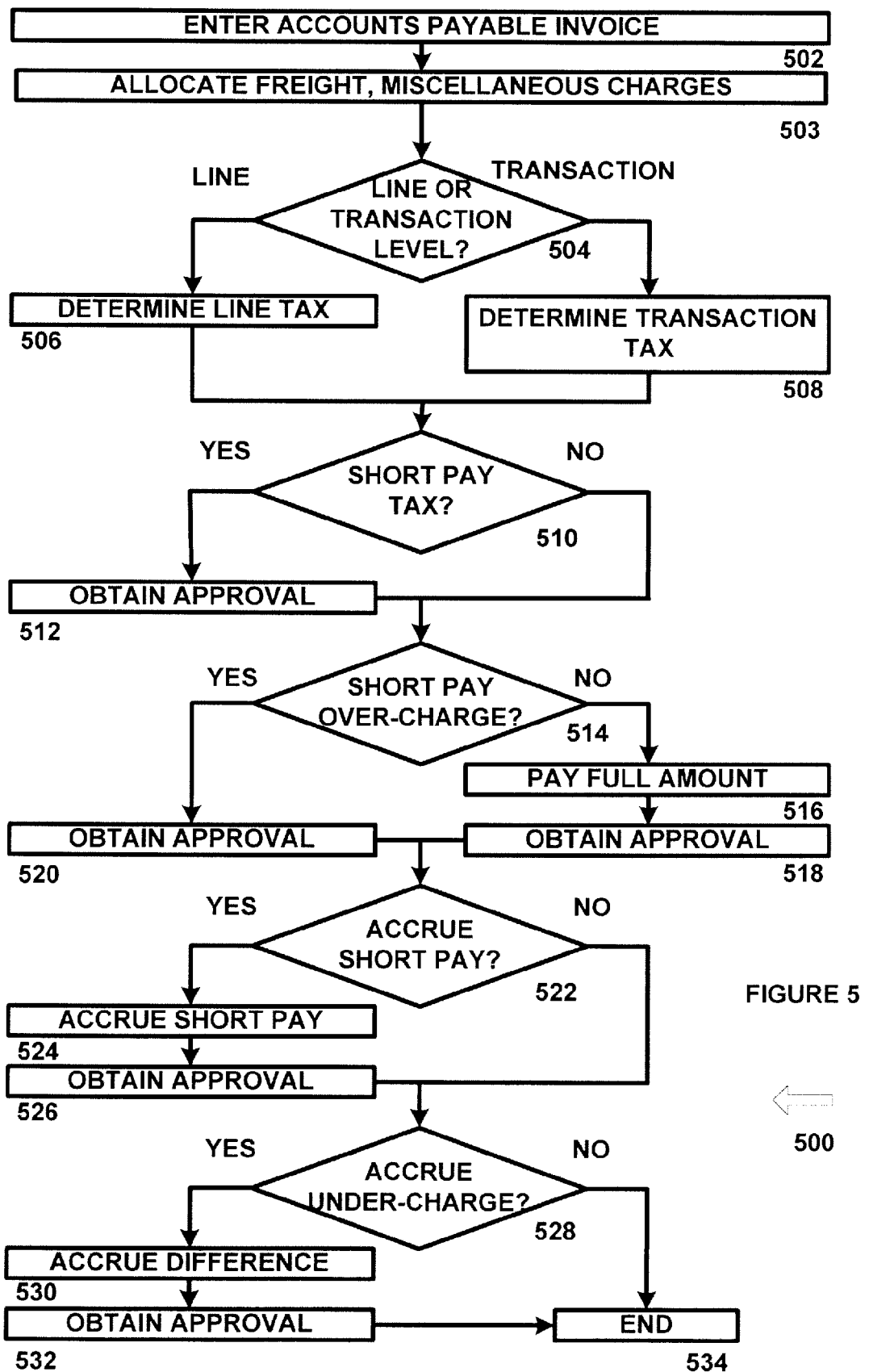
FIG. 5 is a flowchart of a method for processing an accounts payable statement or invoice in accordance with an exemplary embodiment of the present invention.

FIG. 5 is a flowchart of a method 500 for processing an accounts payable statement or invoice in accordance with an exemplary embodiment of the present invention. The order of steps shown is exemplary, and individual rules can be omitted or performed in other suitable orders.

Method 500 begins at 502 where an accounts payable statement or invoice is entered into an accounts payable processing system. In one exemplary embodiment, the accounts payable processing system can require a user to identify the seller of goods or provider of services, a project code or application code for each line item, or other suitable information that is used to determine whether an invoice or line item in an invoice should be assessed taxes and the jurisdictions for which taxes should be assessed. The method then proceeds to 503.

At 503, freight and miscellaneous charges are allocated based on one or more freight allocation rules. In one exemplary embodiment, the system level rules and jurisdiction override rules can be used to determine whether to combine the charges (base and freight/other charges) together in order to effectively calculate the proper tax, such as where the tax status of a freight charge depends on the tax status of the underlying charge to which the freight applies. Likewise, if there is no dependency between freight/other charges and the base charges, separate line items for freight and other charges can be separately handled. In addition, freight and other charges can be allocated back to their respective base charges, or booked to a separate account such as a common freight account, a finance charge account, or other suitable accounts. Likewise, one or more rules can allocate freight and miscellaneous charges to a project, task, expenditure or other suitable categories based on attributes assigned to the base charge account.

At 504, it is determined whether a line or transaction level of detail is required. In one exemplary embodiment, a rule for determining a transaction level of detail may be implemented for jurisdictions that set a maximum tax per transaction, so as to avoid overpayment of taxes due to processing at a line level of detail. Likewise, rules can be applied based on product-specific overrides, jurisdiction overrides, or other suitable overrides, regardless of the associated tax jurisdiction. If it is determined at 504 that line level processing is required, the method proceeds to 506 where rules are implemented for line level tax calculation. Otherwise, the method proceeds to 508 where rules are implemented for transaction level tax calculation. The method proceeds to 510 from 506 or 508.

At 510, it is determined whether a rule for short payment of all taxes should be implemented. In one exemplary embodiment, the tax assessed by the seller may be short paid, such as where the buyer has the responsibility for ensuring payment of all taxes for a tax jurisdiction. In this exemplary embodiment, the buyer can avoid improper payment of taxes, inadvertent failure to pay taxes that may have already been paid to a seller (such as where the seller goes out of business prior to making the tax payment), or other undesirable conditions. Likewise, rules can be applied based on product-specific overrides, jurisdiction overrides, or other suitable overrides, regardless of the associated tax jurisdiction. If it is determined at 510 that all tax should be short paid, then the method proceeds to 512 where it is determined whether an approval rule has been implemented. In one exemplary embodiment, approval may be required for short payment of all taxes when the amount of taxes exceeds the predetermined dollar amount, predetermined percentage of total amounts, or other suitable functions may be performed. If it is determined that at 512 that an approval has been satisfied, then the method proceeds to 514. Likewise, if it is determined that a rule for short payment of all taxes has not been implemented, the method proceeds to 514.

At 514, it is determined whether a rule has been implemented to short-pay on an overcharged tax amount. In one exemplary embodiment, an amount of tax on an invoice for a line item may be overcharged, such that the amount of overcharge can be deducted from the invoice to avoid the need to seek a refund from the seller or tax authority. Likewise, rules can be applied based on product-specific overrides, jurisdiction overrides, or other suitable overrides, regardless of the associated tax jurisdiction. If it is determined at 514 that a rule has been implemented to short pay the overcharge, the method proceeds to 520 where it is determined whether a rule requiring approval to be obtained has been implemented. In one exemplary embodiment, rules for approval for short payment of overcharges can be set based on the dollar amount of the short-pay, the percentage of the short-pay based on the total amount of underlying goods or products sold or in other suitable manners. The method then proceeds to 522. Likewise, if it is determined that short payment of the overcharge amount is not required, the method proceeds to 516 where the full amount is paid. The method then proceeds to 518 where it is determined whether rules for approval of full payment have been implemented, such as where an amount of full payment exceeds a predetermined amount. The method then proceeds to 522.

At 522, it is determined whether rules have been implemented for accruing or tracking short-paid tax amounts. In one exemplary embodiment, a rule can be set for a short paid amount to be accrued so as to keep track of the amount of overcharges, to set aside short-pay amounts for subsequent payment in the event of a mistake, or for other suitable purposes. Likewise, rules can be applied based on product-specific overrides, jurisdiction overrides, or other suitable overrides, regardless of the associated tax jurisdiction. The method then proceeds to 526 where it is determined whether rules for obtaining approval for accrual of short-pay have been implemented, such as where the amounts for accrual exceed predetermined limits. The method then proceeds to 528. Likewise, if it is determined that accrual of short-paid tax amounts is not required, the method proceeds to 528.

At 528, it is determined whether rules to accrue undercharged taxes have been implemented. In one exemplary embodiment, when a tax amount is undercharged from a seller, the buyer can elect to accrue the difference and make the payment directly to a tax authority, such as where the buyer ultimately retains responsibility for payment of taxes. Likewise, rules can be applied based on product-specific overrides, jurisdiction overrides, or other suitable overrides, regardless of the associated tax jurisdiction. If it is determined that rules for accrual of undercharges have been implemented, the method proceeds to 530 where the difference between the charged tax amount and underpaid tax amount are accrued, so that the difference can be paid directly to the taxing authority, to the seller, or other suitable individuals. The method then proceeds to 532 where it is determined whether rules requiring approval for accrual have been implemented. In one exemplary embodiment, approval for retaining a predetermined amount of an undercharged amount of tax instead of paying the seller directly can be set based on the amount of undercharged tax or other suitable manners. The method then proceeds to 534 and terminates. Likewise, if it is determined at 528 that accrual of undercharges is not required, the method proceeds to 534 and terminates.

In operation, method 500 allows an accounts payable processing system to implement tax rules that vary based on the city, state, county, or other jurisdictions that a seller and buyer may be subject to. Method 500 thus avoids overpayment of taxes and the need to audit such tax payments periodically to determine amounts that should be refunded, and further allows sellers and buyers to avoid underpayment of taxes and the resulting potential tax liability.

Figure 6:
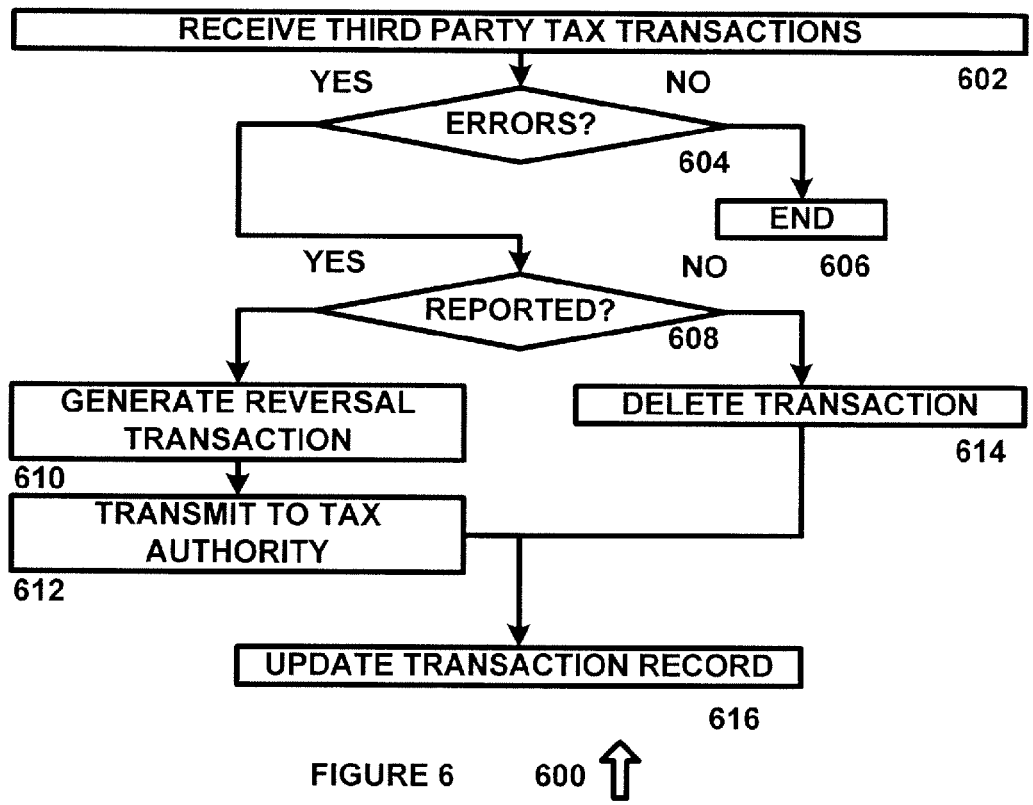
FIG. 6 is a flowchart of a method for deleting errors from a third party tax processing system in accordance with an exemplary embodiment of the present invention.

FIG. 6 is a flowchart of a method 600 for deleting errors from a third party tax processing system in accordance with an exemplary embodiment of the present invention. Method 600 begins at 602, where third party tax transactions are received, such as from a third party tax engine or other suitable applications. The method then proceeds to 604 where it is determined whether there are errors present in the third party tax transaction, such as by comparing the transactions to transactions in an accounts payable system. If it is determined that no errors are present, the method proceeds to 606 and terminates. Otherwise, the method proceeds to 608 where it is determined whether the transaction has been reported to a tax jurisdiction. If the transaction has not been reported, the method proceeds to 614, where the transaction is deleted, and the method then proceeds to 616. Otherwise, the method proceeds to 610.

At 610, a reversal transaction is generated. The method then proceeds to 612, where the reversal transaction is transmitted to a tax jurisdiction, such as to reverse an improperly recorded tax transaction. The method then proceeds to 616.

At 616, transaction records are updated to reflect the correction. In one exemplary embodiment, an accounts payable system record can be updated to reflect the deletion, reversal, the reversal tax transaction, or other suitable data. The method can then return to 608 for processing of other errors, or can terminate if no other transactions are present.

In operation, method 600 allows reconciliation between third party tax applications and an accounts payable system or other systems to be performed, so as to correct errors that may have been introduced by the third party tax application.

Figure 7:
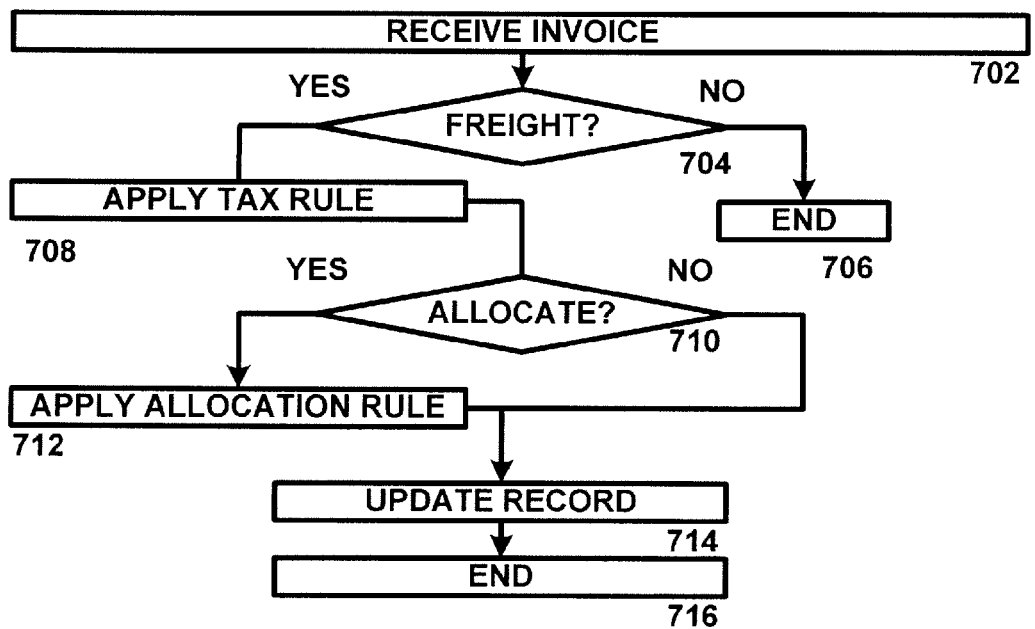
FIG. 7 is a flowchart of a method for allocating freight tax and charges in accordance with an exemplary embodiment of the present invention.

FIG. 7 is a flowchart of a method 700 for allocating freight tax and charges in accordance with an exemplary embodiment of the present invention. Method 700 begins at 702, where an invoice is received. In one exemplary embodiment, the processing of freight can be performed in conjunction with the application of tax rules in method 500, such as for each line item, for an invoice, or in other suitable manners. The method then proceeds to 704.

At 704, it is determined whether freight charges are present. If no freight charges are present, the method proceeds to 706 and terminates. Otherwise, the method proceeds to 708 where a tax rule is applied. In one exemplary embodiment, taxes on freight can be allocated based on the underlying base charge or in other suitable manners. The method then proceeds to 710.

At 710, it is determined whether the freight charge should be allocated to a predetermined account, such as a freight account or other suitable accounts. If it is determined that an allocation rule does not exist, the method proceeds to 714. Otherwise, the method proceeds to 712 where the allocation rule is applied. Likewise, other miscellaneous charges can also be applied where applicable. The method then proceeds to 714.

At 714, associated records are updated to reflect the freight taxation rule application or allocation rule application. The method then proceeds to 716 and terminates.

In operation, method 700 allows freight to be taxed based on one or more freight taxation rules, such as where freight charges are not taxable if an underlying base charge is not taxable. Likewise, other miscellaneous charges can be allocated based on charge allocation rules.

Figure 8A:
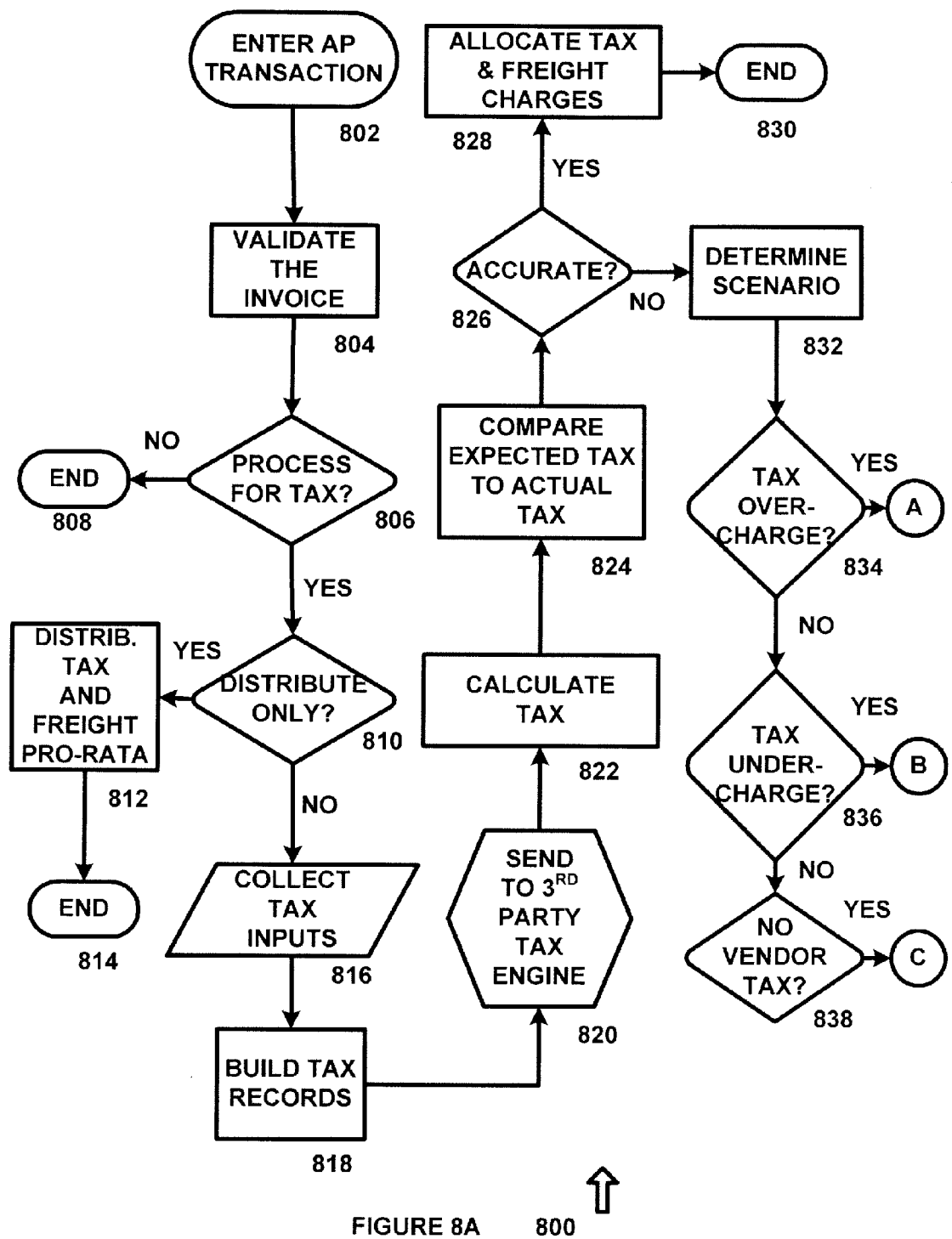

FIGS. 8A and 8B are diagrams of a method 800 in accordance with an exemplary embodiment of the present invention. Method 800 allows a user to determine a tax scenario, such as overtax, undertax, zero tax, direct pay, tax only, or other suitable scenarios. The tax action sets are reviewed to determine an action based on amount differences, such keep existing tax, correct the tax, place on hold, or other suitable actions. If direct pay, is selected, all tax is self paid and tax amounts are self-accrued. If direct pay is not selected, the appropriate jurisdiction settings for the scenario are selected, including any rules, overrides, or other suitable settings.

Method 800 begins at 802, where an accounts payable transaction is entered. In one exemplary embodiment, the transaction can be an invoice, an entry, or other suitable transactions. The method then proceeds to 804 where the invoice is validated, the method then proceeds to 806.

At 806, it is determined whether tax processing should be performed. If tax processing is not performed, the method proceeds to 808 and terminates. Otherwise, the method proceeds to 810 where it is determined whether distribution of freight or other charges only is to be performed. If distribution only is to be performed, such as based on one or more rules or overrides, the method proceeds to 812 where the distribution of freight or other charges is performed, such as to allocate freight based on underlying charges, to allocate freight to a freight account, or to perform other suitable functions. The method then terminates at 814.

If distribution only is not performed, the method proceeds to 818 where tax inputs are obtained, such as tax line items, underlying charges associated with the tax, system-level rules, and other suitable data. The method then proceeds to 818 where tax records are built, such as to place the tax inputs into a format compatible with a third party tax engine that applies a plurality of tax rules. The method then proceeds to 820.

At 820, the tax records are sent to a third party tax engine, and the tax is calculated at 822. The results are then compared at 824 to determine whether the actual tax matches the expected tax. If it is determined at 826 that the results are accurate, the method proceeds to 828 where tax, freight and other suitable charges are allocated, and the method then terminates at 830. Otherwise, the method proceeds to 832.

At 832, the appropriate scenario is determined based on one or more rules, jurisdiction overrides, or other suitable controls, such as a tax overcharge scenario, a tax undercharge scenario, a no vendor tax scenario, or other suitable scenarios. The method then proceeds to 834, where it is determined whether a tax overcharge scenario exists. If a tax overcharge scenario exists, the method proceeds to connector A of FIG. 8B, otherwise the method proceeds to 836.

At 836, it is determined whether a tax undercharge scenario exists. If a tax undercharge scenario exists, the method proceeds to connector B of FIG. 8B, otherwise the method proceeds to 838.

At 838, it is determined whether a no vendor tax scenario exists. If a no vendor tax scenario exists, the method proceeds to connector C of FIG. 8B. If additional or different scenarios are available, additional or different decision steps can also or alternatively be provided.

At connector A of FIG. 8B, the method proceeds to 840 where it is determined whether to direct pay taxes, such as based on one or more system rules or overrides, jurisdiction rules or overrides, product based rules or overrides, or other suitable controls. If direct pay is not required, the method proceeds to 846 where the tax difference is short paid, and the method proceeds to 848 where tax, freight and other variables are allocated, and the accounts payable invoice is reduced accordingly. The method then terminates at 850, or can return to 802 or other suitable process steps for processing of other entries.

If it is determined at 840 that direct pay is required, the method proceeds to 852 where all vendor tax is short paid and self accrued into a suitable escrow account. The method then proceeds to 854 where tax, freight and other variables are allocated, the accounts payable invoice is reduced and the tax liability is recorded. The method then proceeds to 856 and terminates, or can return to 802 or other suitable process steps for processing of other entries.

At connector B of FIG. 8B, the method proceeds to 842 where it is determined whether to direct pay taxes, such as based on one or more system rules or overrides, jurisdiction rules or overrides, product based rules or overrides, or other suitable controls. If direct pay is not required, the method proceeds to 858 where the remaining tax is self accrued, and the method proceeds to 860 where tax, freight and other variables are allocated, and the liability is recorded. The method then terminates at 862, or can return to 802 or other suitable process steps for processing of other entries.

If it is determined at 842 that direct pay is required, the method proceeds to 864 where all vendor tax is short paid and self accrued into a suitable escrow account. The method then proceeds to 866 where tax, freight and other variables are allocated, the accounts payable invoice is reduced and the tax liability is recorded. The method then proceeds to 868 and terminates, or can return to 802 or other suitable process steps for processing of other entries.

At connector C of FIG. 8B, the method proceeds to 844 where it is determined whether to direct pay taxes, such as based on one or more system rules or overrides, jurisdiction rules or overrides, product based rules or overrides, or other suitable controls. If direct pay is not required, the method proceeds to 876 where the tax is not accrued, and the method proceeds to 878 where tax, freight and other variables are allocated. The method then terminates at 880, or can return to 802 or other suitable process steps for processing of other entries.

If it is determined at 844 that direct pay is required, the method proceeds to 870 where use tax is self accrued into a suitable escrow account and the tax liability is recorded. The method then proceeds to 872 where tax, freight and other variables are allocated. The method then proceeds to 874 and terminates, or can return to 802 or other suitable process steps for processing of other entries.

Although exemplary embodiments of a system and method of the present invention have been described in detail herein, those skilled in the art will also recognize that various substitutions and modifications can be made to the systems and methods without departing from the scope and spirit of the appended claims.

The invention claimed is:

1. An electronic system for generation of accounts payable processing system tax rules comprising:
a tax account system implemented on a processor for electronically generating an account for a tax jurisdiction;

an over-tax rule system for electronically generating one or more rules for paying a tax amount in excess of a required tax amount associated with the tax jurisdiction;

an under-tax rule system for electronically generating one or more rules for processing a tax amount that is less than the required tax amount associated with the tax jurisdiction; and a freight system for electronically allocating a first portion of a freight charge to a first underlying charge to which the first portion of the freight charge applies, where the first underlying charge is taxable in a tax jurisdiction associated with the first underlying charge, and for allocating a second portion of the freight charge to a second underlying charge to which the second portion of the freight charge applies, where the second underlying charge is not taxable in a tax jurisdiction associated with the second underlying charge.

2. The system of claim 1 further comprising a zero tax system for electronically generating one or more rules for determining to pay no invoiced taxes for the required tax amount associated with the tax jurisdiction.

3. The system of claim 1 further comprising a calculation level system for electronically generating one or more rules for paying freight taxes as a function of a line level or transaction level of detail for the tax jurisdiction.

4. The system of claim 1 further comprising a short pay tax system for electronically generating one or more rules for determining to short pay invoiced taxes for the tax jurisdiction to correct a vendor overcharge.

5. The system of claim 1 further comprising a self accrue system for electronically generating one or more rules for determining to self accrue taxes for the tax jurisdiction.

6. The system of claim 1 further comprising a notification system for electronically generating one or more rules for generating notification for one or more users for processing the tax amount at a level different from a level invoiced by the vendor for the tax jurisdiction.

7. A computer-implemented method for processing accounts payables comprising:

electronically selecting a tax jurisdiction for each of a plurality of invoice items stored in a non-transitory data memory device;

electronically executing an over-tax rule for processing a tax amount in excess of a required tax amount associated with a first invoice item as a function of the tax jurisdiction for the first invoice item, where an invoiced tax amount is greater than the required tax amount;

electronically executing an under-tax rule for processing a tax amount that is less than a required tax amount associated with a second invoice item as a function of the tax jurisdiction for the second invoice item; and executing a freight allocation rule to allocate a first freight charge to underlying charges and to pay a tax for the first freight charge based on one or more jurisdictions associated with the underlying charges, wherein a first portion of the first freight charge is allocated to a first underlying charge to which the first portion of the first freight charge applies, where the first underlying charge is taxable in a tax jurisdiction associated with the first underlying charge, and a second portion of the first freight charge is allocated to a second underlying charge to which the second portion of the first freight charge applies, where the second underlying charge is not taxable in a tax jurisdiction associated with the second underlying charge.

8. The method of claim 7 further comprising electronically determining to pay no taxes for a second freight charge if an underlying charge associated with the second freight charge is not taxable.

9. The method of claim 7 further comprising electronically executing a calculation level rule for electronically determining to pay taxes as a function of a line level or transaction level regardless of an amount of tax invoiced.

10. The method of claim 7 further comprising electronically executing a short pay overcharge rule for electronically determining to short pay overcharged taxes associated with a third invoice item by more than the amount that would normally be due as a function of the associated tax jurisdiction for the third invoice item.

11. The method of claim 7 further comprising electronically executing a self accrue rule for electronically self accruing taxes associated with a third invoice item as a function of the associated tax jurisdiction for the third invoice item.

12. The method of claim 7 further comprising electronically executing a freight allocation rule for electronically allocating freight charges to a separate freight tax account without regard to a taxability of underlying charges associated with the freight charges.

13. A system or generation of accounts payable processing system tax rules comprising:

means for generating an account for a tax jurisdiction;

means for generating one or more rules for paying a tax amount in excess of a required tax amount associated with the tax jurisdiction;

means for generating one or more rules for processing a tax amount that is less than the required tax amount associated with the tax jurisdiction; and a freight system for electronically allocating a first portion of a freight charge to a first underlying charge to which the first portion of the freight charge applies, where the first underlying charge is taxable in a tax jurisdiction associated with the first underlying charge, and for allocating a second portion of the freight charge to a second underlying charge to which the second portion of the freight charge applies, where the second underlying charge is not taxable in a tax jurisdiction associated with the second underlying charge.

14. The system of claim 13 further comprising means for generating one or more rules for paying no invoiced freight taxes for the associated tax jurisdiction.

15. The system of claim 13 further comprising means for generating one or more rules for paying freight taxes based on a line level or transaction level of detail for the tax jurisdiction.

16. The system of claim 13 further comprising means for generating one or more rules for short paying overcharged freight taxes for the tax jurisdiction.

17. The system of claim 13 further comprising means for generating one or more rules for self accruing freight taxes for the tax jurisdiction.

18. The system of claim 13 further comprising means for generating one or more rules for generating notification for one or more users for processing the freight tax amount for the tax jurisdiction.

19. The system of claim 1 comprising a direct payment system for electronically generating a plurality of rules for processing accounts payables for a purchaser to make direct tax payments for predetermined jurisdictions.

20. The method of claim 7 further comprising:

electronically executing a short pay overcharge rule for electronically determining to short pay overcharged taxes associated with a third invoice item by more than the amount that would normally be due as a function of the associated tax jurisdiction for the third invoice item; and electronically executing a self accrue rule for electronically self accruing taxes associated with a fourth invoice item as a function of the associated tax jurisdiction for the fourth invoice item.

21. The method of claim 20 further comprising electronically executing a freight allocation rule for electronically allocating freight charges to a separate freight tax account without regard to a taxability of underlying charges associated with the freight charges.

* * * * *

UNITED STATES PATENT AND TRADEMARK OFFICE
CERTIFICATE OF CORRECTION

PATENT NO. : 8,156,019 B2  
APPLICATION NO. : 11/977220  
DATED : April 10, 2012  
INVENTOR(S) : Christopher Wilson and Michael Williamson Page 1 of 1

It is certified that error appears in the above-identified patent and that said Letters Patent is hereby corrected as shown below:

Column 18, line 24, claim 13, replace "or" with "for"

Signed and Sealed this
Fifteenth Day of May, 2012

David J. Kappos
*Director of the United States Patent and Trademark Office*